United States Patent
Duan et al.

(10) Patent No.: US 12,362,656 B2
(45) Date of Patent: Jul. 15, 2025

(54) RIPPLE CONTROL METHOD FOR MODULAR CASCADED POWER CONVERSION DEVICE

(71) Applicant: SANTAK ELECTRONIC (SHENZHEN) CO., LTD., Shenzhen (CN)

(72) Inventors: Jiajie Duan, Shanghai (CN); Qiang Chen, Shanghai (CN); Jianxiong Yu, Shanghai (CN); Cheng Luo, Shanghai (CN)

(73) Assignee: Santak Electronic (Shenzhen) Co., Ltd., Shenzhen (CN)

( * ) Notice: Subject to any disclaimer, the term of this patent is extended or adjusted under 35 U.S.C. 154(b) by 215 days.

(21) Appl. No.: 18/240,622

(22) Filed: Aug. 31, 2023

(65) Prior Publication Data

US 2024/0079873 A1    Mar. 7, 2024

(30) Foreign Application Priority Data

Sep. 2, 2022  (CN) .......................... 202211072722.9

(51) Int. Cl.
*H02M 1/14* (2006.01)
*H02M 1/00* (2006.01)
(Continued)

(52) U.S. Cl.
CPC ........... *H02M 1/14* (2013.01); *H02M 1/0074* (2021.05); *H02M 3/33523* (2013.01); *H02M 7/219* (2013.01)

(58) Field of Classification Search
CPC ........ H02M 1/14; H02M 1/007; H02M 7/219; H02M 3/33523
See application file for complete search history.

(56) References Cited

U.S. PATENT DOCUMENTS

| | | | |
|---|---|---|---|
| 2022/0416684 A1* | 12/2022 | Awal | H02M 7/219 |
| 2023/0231466 A1* | 7/2023 | Dong | H02M 1/0025 363/15 |
| 2023/0402936 A1* | 12/2023 | Farivar | H02M 3/155 |

FOREIGN PATENT DOCUMENTS

WO    WO-2018172671 A1 *  9/2018  .............. H02M 7/25

OTHER PUBLICATIONS

Machine Translation of WO2018172671A1 by Clarivate Analytics, May 2025, 11 pages.*

(Continued)

*Primary Examiner* — Harry R Behm
(74) *Attorney, Agent, or Firm* — Stanek Lemon Crouse Meeks, PA

(57) ABSTRACT

A ripple control method for a modular cascaded power conversion device is provided. The method obtains, according to a grid voltage vector of three-phase AC power, a second-order fluctuating voltage superposition vector representing the total amount of second-order fluctuating voltages on respective floating DC sides of the three phases; determines a single-phase power control amount of each phase to be transferred from the floating DC sides to a low-voltage DC side; determines a single-module power control amount of each power module to be transferred to a low-voltage DC side thereof; and generates a single-module control signal for controlling the power module, so as to transfer a second-order fluctuating voltage on a floating DC side of the power module to the low-voltage DC side thereof. A modular cascaded power conversion device is also provided.

11 Claims, 8 Drawing Sheets

(51) Int. Cl.
*H02M 3/335* (2006.01)
*H02M 7/219* (2006.01)

(56) References Cited

OTHER PUBLICATIONS

Drabek, Pavel; Poljak, Ladislav; Metods for voltage ripple mitigation on DC side of single-phase ACIDC converters; IEEE 2015 International Conference on Applied Electronics, Sep. 2015, 4 pages.*

Linghui Meng; Zeliang Shu; Yuan Lei; Han Yan; Zuyong Li; Lan Ma; Optimal Input and Output Power Quality Control of Single-Phase AC-DC-DC Converter With Significant DC-Link Voltage Ripple; IEEE Transactions on Industrial Control. Dec. 12, 2019; pp. 10366-10376.*

* cited by examiner

RIPPLE CONTROL METHOD FOR MODULAR CASCADED POWER CONVERSION DEVICE

CROSS-REFERENCE TO RELATED APPLICATIONS

Priority is claimed to Chinese Patent Application No. 202211072722.9 filed on Sep. 2, 2022, the entire disclosure of which is hereby incorporated by reference herein.

TECHNICAL FIELD

The present invention relates to the field of power conversion and power control, and specifically to a ripple control method for a modular cascaded power conversion device.

BACKGROUND

A medium-voltage power conversion device can be directly connected to a medium-voltage grid, and convert the power to internal DC power, so as to subsequently convert the DC power to AC output power for supply to a load. The medium-voltage power conversion device has the characteristics of high power density, fast adjustment speed, small size, etc. One of the preferred structures adopts a modular cascaded topology, which has outstanding advantages such as a large number of levels, good harmonic characteristics, and easy realization of high voltage and large capacity, and is very suitable for ultra-large-scale power supplies.

FIG. 1 shows a schematic diagram of a topology structure of a modular cascaded power conversion device. As shown in FIG. 1, a modular cascaded power conversion device 1 includes three single-phase power conversion modules 11, 12 and 13 having the same structure, which are connected to corresponding phase-A, phase-B and phase-C mains by means of inductors $L_{ac}$, respectively. Each single-phase power conversion module consists of n power modules having the same structure. Taking a power module 111 of the single-phase power conversion module 11 as an example, the power module 111 includes an AC-DC converter 1111 that accepts a single-phase voltage of a power grid and rectifies the single-phase voltage to output the same to a floating DC side at an intermediate stage, and an isolated DC-DC converter 1112 whose input end is connected to a floating DC side 1110 at the intermediate stage and which performs DC-DC conversion on the rectified DC voltage to output the same to a low-voltage DC side 101. The isolated DC-DC converter 1112 consists of a DC-AC module 11121, an isolation transformer 11122 and an AC-DC module 11123. An input end of the DC-AC module 11121 is connected to the floating DC side at the intermediate stage, and its inverted voltage is output to a primary side winding of the isolation transformer 11122. An output end of the AC/DC module 11123 is connected to a secondary side winding of the isolation transformer 11122 and rectifies a transformed AC voltage to output the same to the low-voltage DC side 111. The n power modules of each single-phase power conversion module are configured in the order from a first stage to an nth stage so that input ends of the respective AC-DC converters are connected in series to form a cascaded bridge of the phase, and AC input ends of respective last-stage (i.e., nth-stage) AC-DC converters of the three-phase power conversion modules are connected in parallel to a reference point N. Output ends of the n power modules of the respective power conversion modules of the three phases are connected in parallel to the low-voltage DC side, respectively. Thus, the power conversion device 1 forms a modular cascaded topology, in which a first capacitor 1113 is further configured on the floating DC side at the intermediate stage of each power module, and a second capacitor 1114 is further configured on the low-voltage DC side at the output end of each power module. The power conversion device adopting the modular cascaded topology structure enables AC-DC converters to be connected in series with each other on a rectification side receiving the medium-voltage mains, which can withstand a higher grid AC voltage, and the respective power modules are connected in parallel on the low-voltage DC side at the output end, which can obtain a stable low-voltage output.

The power conversion device using the modular cascaded topology shown in FIG. 1 has the following power characteristics: after the mains are sinusoidally modulated by the AC-DC converters, the power absorbed by each power module includes undesirable voltage or current fluctuations on the floating DC side at the intermediate stage thereof, and the components of the fluctuations are mainly second-order fluctuations. The second-order voltage fluctuation causes the first capacitor 1113 at the intermediate stage to withstand greater power stress, which is disadvantageous to the miniaturization of the first capacitor 1113, and thus is disadvantageous to the miniaturization of the entire power conversion module. A way to deal with this fluctuation is usually to export the three-phase fluctuations to the low-voltage DC side. Since the three-phase fluctuations are offset at a phase angle of 120° from each other, the amplitudes of the fluctuating voltages can cancel each other on the low-voltage DC side so that the total voltage waveform remains ideal. However, a conduction method for the fluctuating voltage in the prior art comprises: extracting a fluctuating signal from a voltage signal by means of a filter or a resonant controller after the fluctuating voltage occurs at the intermediate stage of each module, measuring real-time values such as a phase angle and an amplitude of the fluctuating signal, and accordingly feeding back a control signal to the module to transfer the fluctuation to a low-voltage DC side. The time used in this process includes the time required for filtering or resonance control, the time required for detecting the fluctuating signal, and the time required for outputting the control signal according to the detected real-time values, and the total time delay is at least at a millisecond level.

SUMMARY

There is a need for a more efficient way to transfer the fluctuating voltage to the low-voltage DC side as soon as possible after the generation of the fluctuating voltage at the intermediate stage, so as to reduce the stress of the fluctuating voltage on the capacitor at the intermediate stage as much as possible. In view of the above problems existing in the prior art, the present inventive concept provides a ripple control method for a modular cascaded power conversion device, the modular cascaded power conversion device receiving three-phase AC power and outputting DC power to a low-voltage DC side, a modular cascaded power conversion device of each phase comprising an inductor and a plurality of power modules, and each power module comprising an AC-DC converter, a floating DC side, and an isolated DC-DC converter, wherein the AC-DC converters of the plurality of power modules are cascaded in sequence, and each AC-DC converter provides an output to a corresponding floating DC side; and an input end of the isolated DC-DC converter is connected to the floating DC side of the power module, and an output end of the isolated DC-DC converter is connected to the low-voltage DC side; the control method comprising:

obtaining, according to a grid voltage vector of the three-phase AC power, a second-order fluctuating voltage superposition vector representing the total amount of second-order fluctuating voltages on respective floating DC sides of the three phases;

determining, according to the second-order fluctuating voltage superposition vector, a single-phase power control amount of each phase which needs to be transferred from the respective floating DC sides of the three phases to the low-voltage DC side;

determining, according to the single-phase power control amount of each phase, a single-module power control amount of each power module which needs to be transferred to a low-voltage DC side thereof; and for each power module, generating a single-module control signal for the corresponding power module according to the single-module power control amount, so as to transfer a second-order fluctuating voltage on the floating DC side of the power module to the low-voltage DC side thereof.

Preferably, in the control method, a cascaded bridge voltage and an AC current in a cascaded AC-DC converter in each phase are obtained by calculating a grid voltage of the modular cascaded power conversion device of the phase, thereby obtaining a three-phase cascaded bridge voltage vector and a three-phase AC current vector; and the second-order fluctuating voltage superposition vector is obtained by performing a calculation according to the cascaded bridge voltage vector and the AC current vector.

Preferably, in the control method, the isolated DC-DC converter is controlled by using a closed-loop control method and by using the second-order fluctuating voltage superposition vector as a deviation amount, so as to determine the single-phase power control amount required to control the magnitude of the second-order fluctuating voltage superposition vector to zero.

Preferably, in the control method, in each phase of the modular cascaded power conversion device, a power distribution ratio of each power module relative to the total power of all power modules of the phase in a power transfer process is determined, and the single-module power control amount of the power module which needs to be transferred from the floating DC side thereof to the low-voltage DC side thereof is obtained according to the product of the power distribution ratio of the power module and the single-phase power control amount of the phase.

Preferably, in the control method, the single-module control signal is formed by superimposing the single-module power control amount and a control amount for controlling the isolated DC-DC converter in the power module to perform DC-DC conversion.

Preferably, in the control method, the three-phase cascaded voltage vector is determined in a three-phase coordinate system as:

$$\begin{bmatrix} V_{CB\_A} \\ V_{CB\_B} \\ V_{CB\_C} \end{bmatrix},$$

and is converted to a d-q rotating coordinate system to be expressed as:

$$\begin{bmatrix} V_{CB\_d} \\ V_{CB\_q} \end{bmatrix};$$

the three-phase AC current vector is determined in the three-phase coordinate system as:

$$\begin{bmatrix} I_A \\ I_B \\ I_C \end{bmatrix},$$

and is converted to the d-q rotating coordinate system to be expressed as:

$$\begin{bmatrix} I_d \\ I_q \end{bmatrix};$$

and the second-order fluctuating voltage superposition vector is determined in the three-phase coordinate system as:

$$\begin{bmatrix} \sum_{m=1}^{n} V_{dc\_2nd\_m\_A} \\ \sum_{m=1}^{n} V_{dc\_2nd\_m\_B} \\ \sum_{m=1}^{n} V_{dc\_2nd\_m\_C} \end{bmatrix} = \frac{1}{2\omega C_{dc} V_{dc}}$$

$$\begin{bmatrix} [V_{CB\_d} \ V_{CB\_q}] \begin{bmatrix} -\cos(2\omega t + 2\theta) & \sin(2\omega t + 2\theta) \\ \sin(2\omega t + 2\theta) & \cos(2\omega t + 2\theta) \end{bmatrix} \\ [V_{CB\_d} \ V_{CB\_q}] \begin{bmatrix} -\cos\left(2\omega t + 2\theta - \frac{4\pi}{3}\right) & \sin\left(2\omega t + 2\theta - \frac{4\pi}{3}\right) \\ \sin\left(2\omega t + 2\theta - \frac{4\pi}{3}\right) & \cos\left(2\omega t + 2\theta - \frac{4\pi}{3}\right) \end{bmatrix} \\ [V_{CB\_d} \ V_{CB\_q}] \begin{bmatrix} -\cos\left(2\omega t + 2\theta + \frac{4\pi}{3}\right) & \sin\left(2\omega t + 2\theta + \frac{4\pi}{3}\right) \\ \sin\left(2\omega t + 2\theta + \frac{4\pi}{3}\right) & \cos\left(2\omega t + 2\theta + \frac{4\pi}{3}\right) \end{bmatrix} \end{bmatrix} \begin{bmatrix} I_d \\ I_q \end{bmatrix},$$

where $\omega$ is an AC frequency, $C_{dc}$ is connection capacitance of the floating DC side, $V_{dc}$ is an average voltage value of the floating DC side, $\theta$ is an initial phase angle, and t is time.

Preferably, in the control method, a relationship between the grid voltage and the three-phase cascaded voltage vector and three-phase AC current vector in the three-phase coordinate system is expressed as:

$$\begin{bmatrix} V_{grid\_A} \\ V_{grid\_B} \\ V_{grid\_C} \end{bmatrix} = \omega L_{ac} \begin{bmatrix} I_A \\ I_B \\ I_C \end{bmatrix} + \begin{bmatrix} V_{CB\_A} \\ V_{CB\_B} \\ V_{CB\_C} \end{bmatrix}$$

where $L_{ac}$ is the inductance of the inductor.

Preferably, in the control method, an X-Y rotating coordinate system is configured according to a rotational angular velocity of the second-order fluctuating voltage superposition vector in the three-phase coordinate system, so that the second-order fluctuating voltage superposition vector is expressed in the X-Y rotating coordinate system as constant quantities on X and Y axes; and the closed-loop control method is performed according to a constant quantity expression for the second-order fluctuating voltage superposition vector in the X-Y rotating coordinate system.

Preferably, in the control method, the constant quantity expression for the second-order fluctuating voltage superposition vector in the X-Y rotating coordinate system is:

$$\begin{bmatrix} \sum V_{dc_{2nd_X}} \\ \sum V_{dc_{2nd_Y}} \end{bmatrix} = \frac{2}{3} \begin{bmatrix} \sin(-2\omega t - \varphi) & \sin\left(-2\omega t - \varphi + \frac{4\pi}{3}\right) & \sin\left(-2\omega t - \varphi - \frac{4\pi}{3}\right) \\ \cos(-2\omega t - \varphi) & \cos\left(-2\omega t - \varphi + \frac{4\pi}{3}\right) & \cos\left(-2\omega t - \varphi - \frac{4\pi}{3}\right) \end{bmatrix}$$

$$\begin{bmatrix} \sum_{m=1}^{n} V_{dc_{2nd_{m_A}}} \\ \sum_{m=1}^{n} V_{dc_{2nd_{m_B}}} \\ \sum_{m=1}^{n} V_{dc_{2nd_{m_C}}} \end{bmatrix}$$

$$= \frac{1}{2\omega C_{dc} V_{dc}}$$

$$\begin{bmatrix} -V_{CB_d}\sin(2\theta - \varphi) - V_{CB_q}\cos(2\theta - \varphi) & -V_{CB_d}\cos(2\theta - \varphi) + V_{CB_q}\sin(2\theta - \varphi) \\ -V_{CB_d}\cos(2\theta - \varphi) + V_{CB_q}\sin(2\theta - \varphi) & V_{CB_d}\sin(2\theta - \varphi) + V_{CB_q}\cos(2\theta - \varphi) \end{bmatrix}$$

$$\begin{bmatrix} I_d \\ I_q \end{bmatrix}$$

The present invention also provides a modular cascaded power conversion device, the modular cascaded power conversion device receiving three-phase AC power and outputting DC power to a low-voltage DC side, a modular cascaded power conversion device of each phase comprising an inductor and a plurality of power modules, and each power module comprising an AC-DC converter, a floating DC side, and an isolated DC-DC converter, wherein the AC-DC converters of the plurality of power modules are cascaded in sequence, each AC-DC converter provides an output to a corresponding floating DC side, and each floating DC side has a first capacitor; and an input end of the isolated DC-DC converter is connected to the floating DC side of the power module, and an output end of the isolated DC-DC converter is connected to the low-voltage DC side; and the modular cascaded power conversion device further comprising a control module configured to perform the ripple control method according to any items of the first aspect of the present invention.

The ripple control method for a modular cascaded power conversion device and the modular cascaded power conversion device configured to perform the control method according to the present inventive concept are different from methods in the prior art, in which for respective power conversion modules, ripples on floating DC sides are separately measured and controlled. In the present inventive concept, ripples of the respective modules of the three phases are combined and mathematically transformed to establish a corresponding relationship with the AC current vector or the cascaded bridge voltage vector, and with reference to the power ratio of power transferred by each power module, the power control amount for controlling each power module can be provided instantaneously (without time delay), so that ripples on the floating DC side are transferred to the low-voltage DC side instantaneously, the response speed is greatly improved, and the capacitance stress and the capacitor volume or specification of the floating DC side are effectively reduced, thereby facilitating the miniaturization and durability of the modular cascaded power conversion device, increasing power density, and reducing usage costs.

BRIEF DESCRIPTION OF THE DRAWINGS

Embodiments of the present inventive concept are further described below with reference to the accompanying drawings.

DETAILED DESCRIPTION OF THE EMBODIMENTS

The present inventive concept is further described in detail below through specific embodiments with reference to the accompanying drawings.

Figure 1:
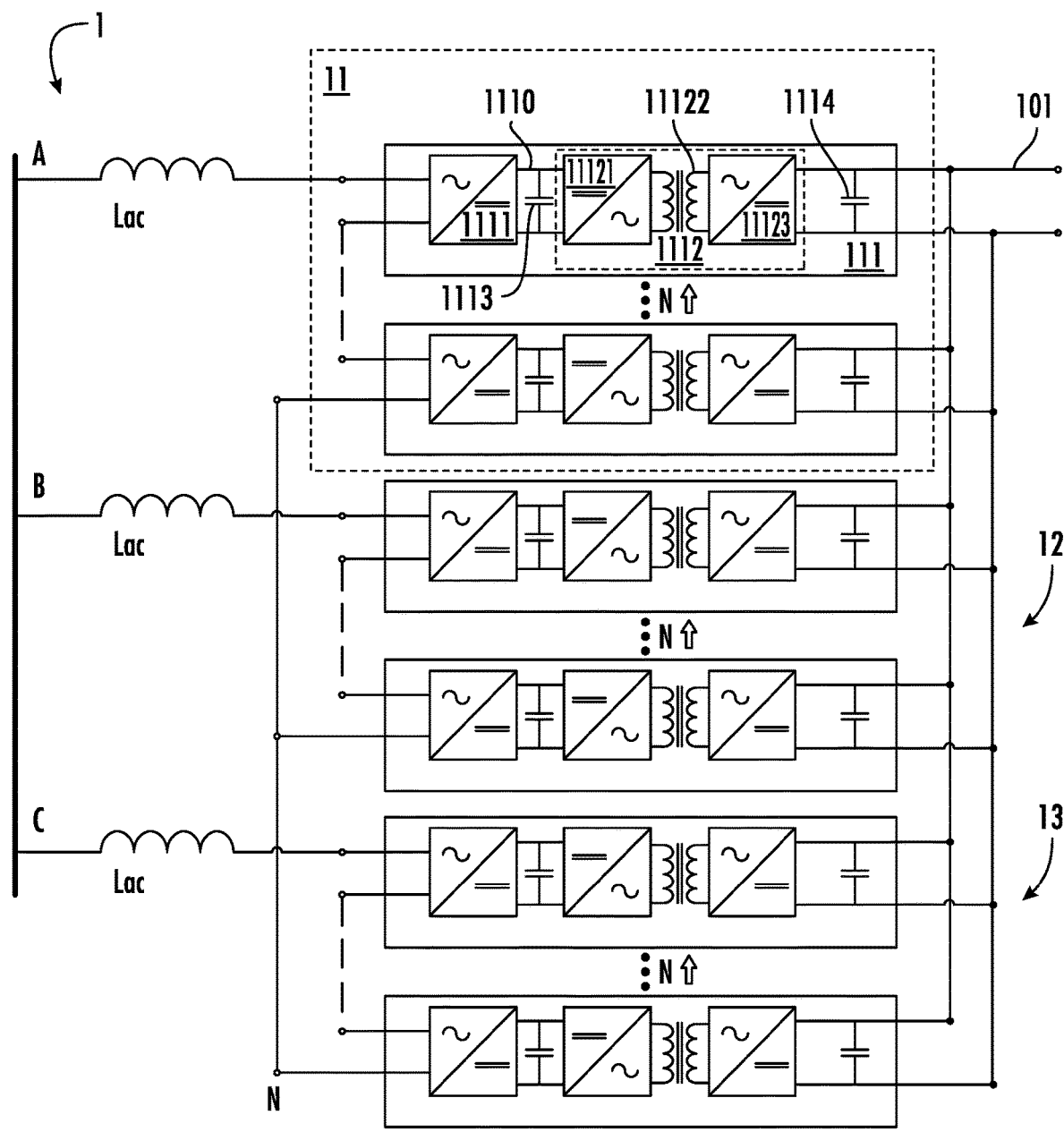
FIG. 1 shows a schematic diagram of a topology structure of a modular cascaded power conversion device.

In the modular cascaded power conversion device shown in FIG. 1, for the input three-phase AC power, a grid voltage vector $V_{grid}$ has the following relationship with an AC current vector and a cascaded bridge voltage vector:

$$\begin{bmatrix} V_{grid\_A} \\ V_{grid\_B} \\ V_{grid\_C} \end{bmatrix} = \omega L_{ac} \begin{bmatrix} I_A \\ I_B \\ I_C \end{bmatrix} + \begin{bmatrix} V_{CB\_A} \\ V_{CB\_B} \\ V_{CB\_C} \end{bmatrix} \quad \text{Equation 1}$$

where ω is an AC frequency, the AC current vector $$Iac = \begin{bmatrix} I_A \\ I_B \\ I_c \end{bmatrix}$$

represents currents in a three-phase cascaded bridge, and the cascaded bridge voltage vector $$V_{CB} = \begin{bmatrix} V_{CB\_A} \\ V_{CB\_B} \\ V_{CB\_C} \end{bmatrix}$$

represents the total voltage of the three-phase cascaded bridge.

Figure 2A:
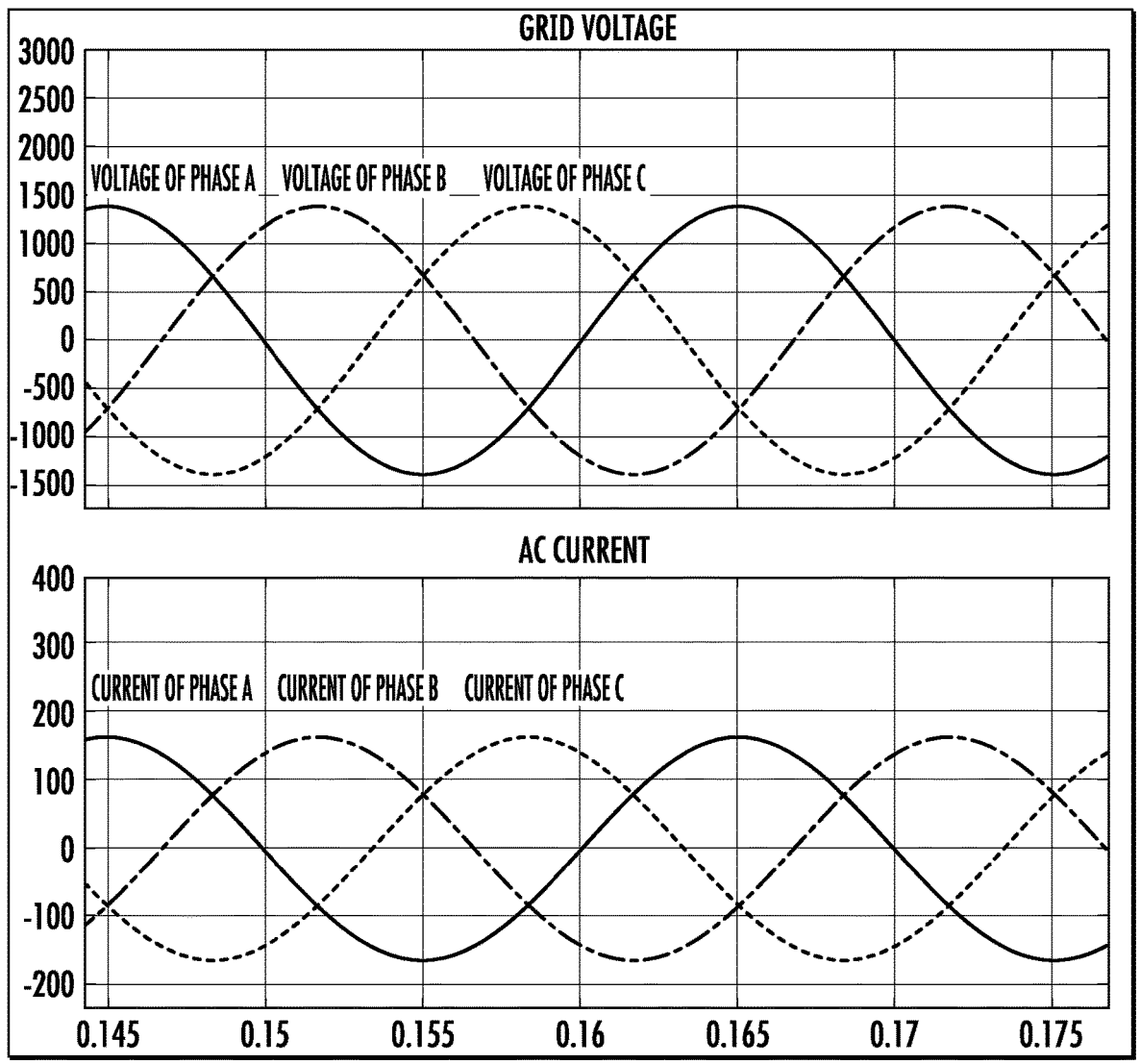
FIG. 2a illustrates waveform diagrams of a grid voltage vector and an AC current vector in a modular cascaded power conversion device from top to bottom.
Figure 2B:
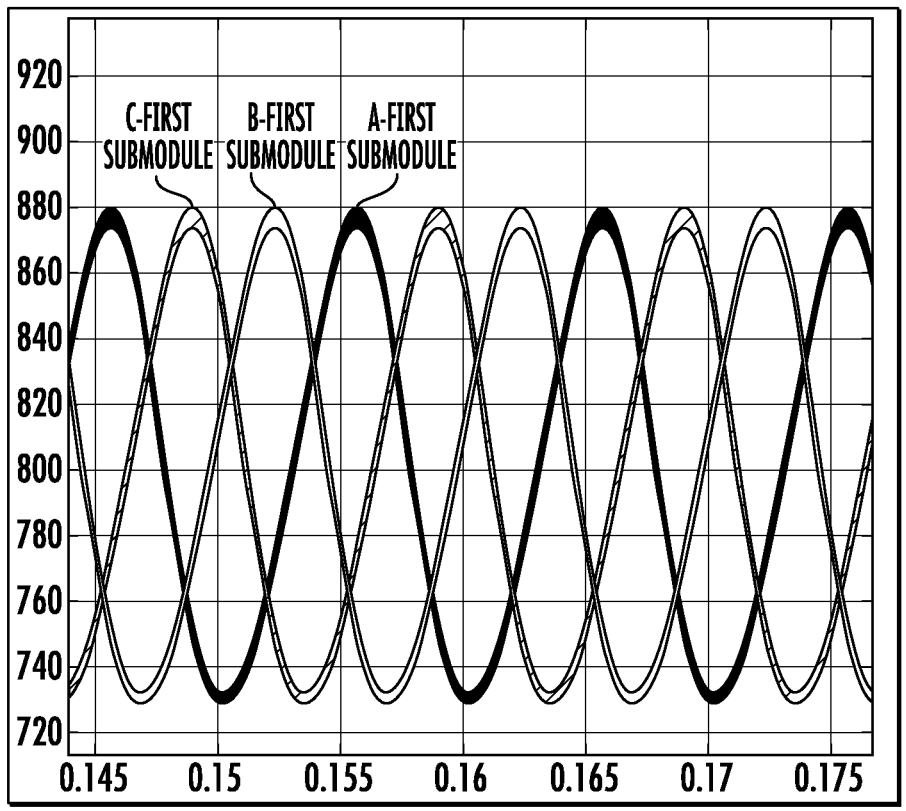
FIGS. 2b and 2c illustrate waveform diagrams of second-order fluctuating voltages occurring on floating DC sides in the modular cascaded power conversion device.
Figure 2C:
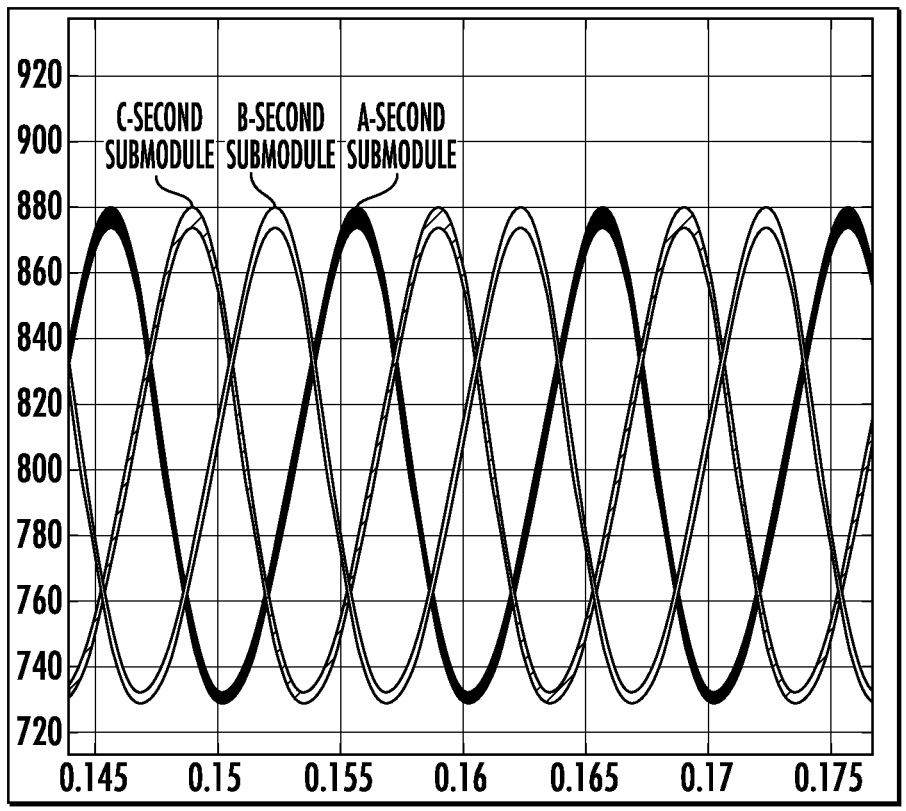

FIG. 2a illustrates waveform diagrams of a grid voltage vector and an AC current vector in a modular cascaded power conversion device from top to bottom. FIGS. 2b and 2c illustrate waveform diagrams of second-order fluctuating voltages occurring on floating DC sides in the modular cascaded power conversion device. For the sake of brief illustration, in the example of FIGS. 2a to 2c, it is assumed that each of the single-phase power conversion modules 11, 12, and 13 as shown in FIG. 1 includes only two power modules. FIG. 2b shows second-order fluctuating voltages generated by respective first power modules of the power conversion modules 11, 12, and 13, respectively, and FIG. 2c shows second-order fluctuating voltages generated by respective second power modules of the power conversion modules 11, 12, and 13, respectively.

As shown in FIG. 2a, the grid voltage or AC current waveforms of phases A, B and C are expressed as a positive-sequence system, that is, among the three phases A, B, and C, the latter lags behind the former by 120° in sequence (shown as rightward translation in FIG. 2a). In contrast, whether for the respective first power modules of the three phases shown in FIG. 2b or for the respective second power modules of the three phases shown in FIG. 2c, the second-order fluctuating voltage waveforms are all expressed in a negative-sequence arrangement, that is, among the three phases A, B, and C, the latter is ahead of the former by 120° in sequence. Since all the power modules in each phase are cascaded, the amplitude and phase angle of the AC power flowing through the input ends of the AC-DC converters of all the power modules in each phase are consistent, which means that the second-order fluctuating voltage vectors generated by all the power modules in each phase can be superimposed.

Figure 3:
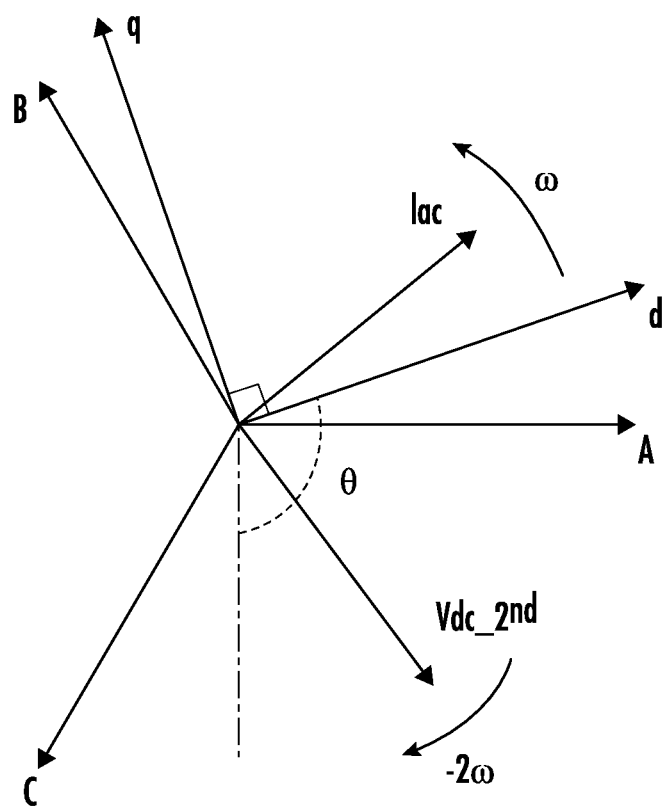
FIG. 3 shows a schematic diagram in which an AC current vector and a second-order fluctuating voltage superposition vector are plotted together in an AC three-phase coordinate system.

FIG. 3 shows a schematic diagram in which an AC current vector and a second-order fluctuating voltage superposition vector are plotted together in an AC three-phase coordinate system.

As shown in FIG. 3, the inventors have found by calculation that in the AC three-phase coordinate system, the AC current vector Iac rotates counterclockwise at an angular frequency of ω with a constant modulus, the second-order fluctuating voltage superposition vector Vdc_2nd rotates clockwise at an angular velocity of 2 ω with a constant modulus, and according to this relationship, the second-order fluctuating voltage superposition vector Vdc_2nd can be quickly calculated.

Hence, a function for obtaining the second-order fluctuating voltage superposition vector Vdc_2nd in the three-phase coordinate system is expressed as Equation 2:

Equation 2

$$\begin{bmatrix} \sum_{m=1}^{n} V_{dc\_2nd\_m\_A} \\ \sum_{m=1}^{n} V_{dc\_2nd\_m\_B} \\ \sum_{m=1}^{n} V_{dc\_2nd\_m\_C} \end{bmatrix} = \frac{1}{2\omega C_{dc} V_{dc}}$$

$$\begin{bmatrix} [V_{CB\_d} \; V_{CB\_q}] \begin{bmatrix} -\cos(2\omega t + 2\theta) & \sin(2\omega t + 2\theta) \\ \sin(2\omega t + 2\theta) & \cos(2\omega t + 2\theta) \end{bmatrix} \\ [V_{CB\_d} \; V_{CB\_q}] \begin{bmatrix} -\cos\left(2\omega t + 2\theta - \frac{4\pi}{3}\right) & \sin\left(2\omega t + 2\theta - \frac{4\pi}{3}\right) \\ \sin\left(2\omega t + 2\theta - \frac{4\pi}{3}\right) & \cos\left(2\omega t + 2\theta - \frac{4\pi}{3}\right) \end{bmatrix} \\ [V_{CB\_d} \; V_{CB\_q}] \begin{bmatrix} -\cos\left(2\omega t + 2\theta + \frac{4\pi}{3}\right) & \sin\left(2\omega t + 2\theta + \frac{4\pi}{3}\right) \\ \sin\left(2\omega t + 2\theta + \frac{4\pi}{3}\right) & \cos\left(2\omega t + 2\theta + \frac{4\pi}{3}\right) \end{bmatrix} \end{bmatrix}$$

$$\begin{bmatrix} I_d \\ I_q \end{bmatrix}$$

where illustratively, $\Sigma^{n}_{m=1} V_{dc\_2nd\_m\_A}$ represents a superposition of the second-order fluctuating voltages generated by n modules in phase A, $[V_{CB\_d} \; V_{CB\_q}]$ represents a vector representation of the cascaded bridge voltage vector $V_{CB}$ in the d-q coordinate system, and $$\begin{bmatrix} I_d \\ I_q \end{bmatrix}$$

represents a vector representation of the AC current vector Iac in the d-q coordinate system. Equation 2 represents that the second-order fluctuating voltage ripples are essentially derived from the energy exchange between the cascaded bridge and the grid. When the AC side voltage of the cascaded bridge adopts sinusoidal modulation with the same frequency as the grid, the energy exchange between the cascaded bridge and the grid includes power at twice the grid frequency shown in Equation 2 (extracted from the product of the AC side voltage vector of the cascaded bridge and the AC current vector). The purpose of converting the above physical quantities from the three-phase coordinate system to the d-q coordinate system is to simplify the calculation, because in the orthogonal d-q coordinate system rotating counterclockwise at the angular frequency co, the AC current vector is stationary relative to the coordinate axes, and the vector value is a constant value (a DC quantity) over time. The conversion equation from the three-phase coordinate system to the d-q coordinate system may use Equation 3:

$$\begin{bmatrix} d \\ q \end{bmatrix} = \frac{2}{3} \begin{bmatrix} \sin(\omega t + \theta) & \sin\left(\omega t + \theta - \frac{2\pi}{3}\right) & \sin\left(\omega t + \theta + \frac{2\pi}{3}\right) \\ \cos(\omega t + \theta) & \cos\left(\omega t + \theta - \frac{2\pi}{3}\right) & \cos\left(\omega t + \theta + \frac{2\pi}{3}\right) \end{bmatrix} \begin{bmatrix} A \\ B \\ C \end{bmatrix} \quad \text{Equation 3}$$

In the present inventive concept, the second-order fluctuating voltage superposition vector can be easily and instantaneously extracted and calculated in the three-phase power conversion device without time delay or with little time delay, because the technical solution of the present inventive concept is not to filter and obtain information of the second-order fluctuations in each power module and perform pulse width modulation control on the power module separately, but to superimpose all second-order fluctuation signals of the $3n$ power modules of the three phases together as a second-order fluctuating voltage superposition vector for analysis.

The second-order fluctuating voltage superposition vector obtained in Equation 2 still contains time variables, and rotates clockwise at an angular velocity of $2\omega$ in the three-phase coordinate system as shown in FIG. 3. Therefore, conversion of the second-order fluctuating voltage superposition vector from the three-phase coordinate system to another orthogonal rotating coordinate system that also rotates clockwise at an angular velocity of $2\omega$, i.e., an X-Y rotating coordinate system, is performed.

Figure 4:
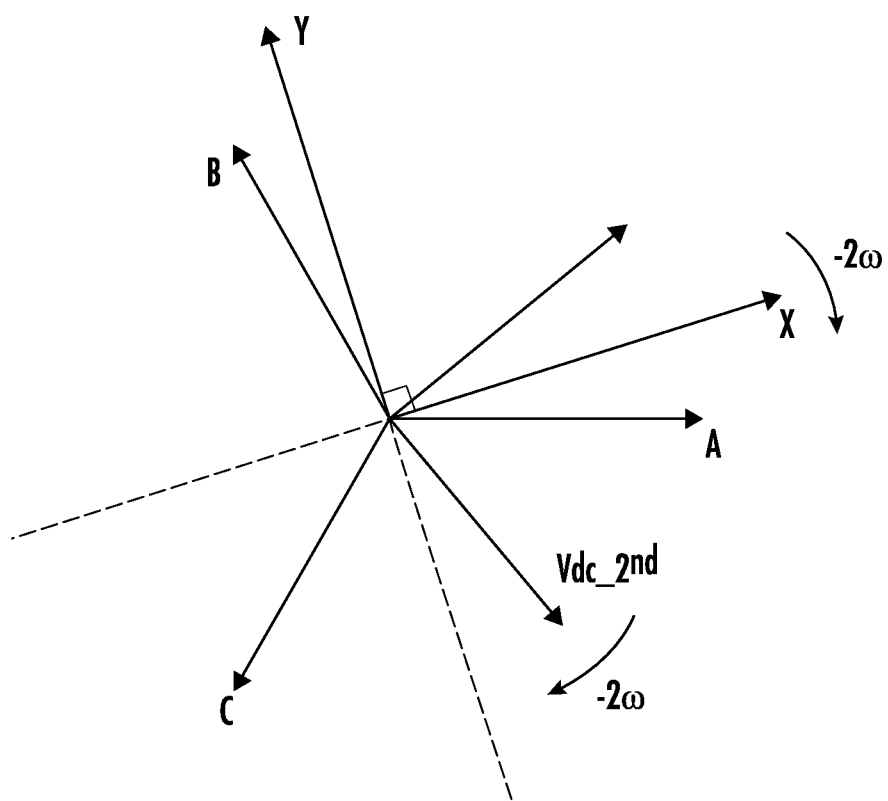
FIG. 4 shows, in a superposition manner, an X-Y rotating coordinate system rotating clockwise at an angular velocity of 2 ω and a stationary three-phase AC coordinate system.

FIG. 4 shows, in a superposition manner, an X-Y rotating coordinate system rotating clockwise at an angular velocity of $2\omega$ and a stationary three-phase AC coordinate system. In FIG. 4, the second-order fluctuating voltage superposition vector Vdc_2nd rotating clockwise at the angular velocity $2\omega$ is a vector form thereof in the stationary three-phase AC coordinate system.

The coordinate system conversion relationship from the three-phase coordinate system to the X-Y rotating coordinate system is shown in Equation 4:

$$\begin{bmatrix} X \\ Y \end{bmatrix} = \frac{2}{3} \begin{bmatrix} \sin(-2\omega t - \varphi) & \sin\left(-2\omega t - \varphi + \frac{4\pi}{3}\right) & \sin\left(-2\omega t - \varphi - \frac{4\pi}{3}\right) \\ \cos(-2\omega t - \varphi) & \cos\left(-2\omega t - \varphi + \frac{4\pi}{3}\right) & \cos\left(-2\omega t - \varphi - \frac{4\pi}{3}\right) \end{bmatrix} \begin{bmatrix} A \\ B \\ C \end{bmatrix} \quad \text{Equation 4}$$

In the X-Y rotating coordinate system, the second-order fluctuating voltage superposition vector is stationary relative to the orthogonal coordinate axes, and components on the X-Y coordinate axes are expressed as DC quantities, which is convenient for calculation and control.

The second-order fluctuating voltage superposition vector Vdc_2nd is expressed as Equation 5 in the X-Y orthogonal coordinate system:

$$\begin{bmatrix} \sum V_{dc\_2nd\_X} \\ \sum V_{dc\_2nd\_Y} \end{bmatrix} = \frac{2}{3} \begin{bmatrix} \sin(-2\omega t - \varphi) & \sin\left(-2\omega t - \varphi + \frac{4\pi}{3}\right) & \sin\left(-2\omega t - \varphi - \frac{4\pi}{3}\right) \\ \cos(-2\omega t - \varphi) & \cos\left(-2\omega t - \varphi + \frac{4\pi}{3}\right) & \cos\left(-2\omega t - \varphi - \frac{4\pi}{3}\right) \end{bmatrix} \quad \text{Equation 5}$$

$$\begin{bmatrix} \sum_{m=1}^{n} V_{dc\_2nd\_m\_A} \\ \sum_{m=1}^{n} V_{dc\_2nd\_m\_B} \\ \sum_{m=1}^{n} V_{dc\_2nd\_m\_C} \end{bmatrix} = \frac{1}{2\omega C_{dc} V_{dc}}$$

$$\begin{bmatrix} -V_{CB\_d}\sin(2\theta - \varphi) - V_{CB\_q}\cos(2\theta - \varphi) & -V_{CB\_d}\cos(2\theta - \varphi) - V_{CB\_q}\sin(2\theta - \varphi) \\ -V_{CB\_d}\cos(2\theta - \varphi) + V_{CB\_q}\sin(2\theta - \varphi) & V_{CB\_d}\sin(2\theta - \varphi) + V_{CB\_q}\cos(2\theta - \varphi) \end{bmatrix} \begin{bmatrix} I_d \\ I_q \end{bmatrix}$$

Figure 5A:
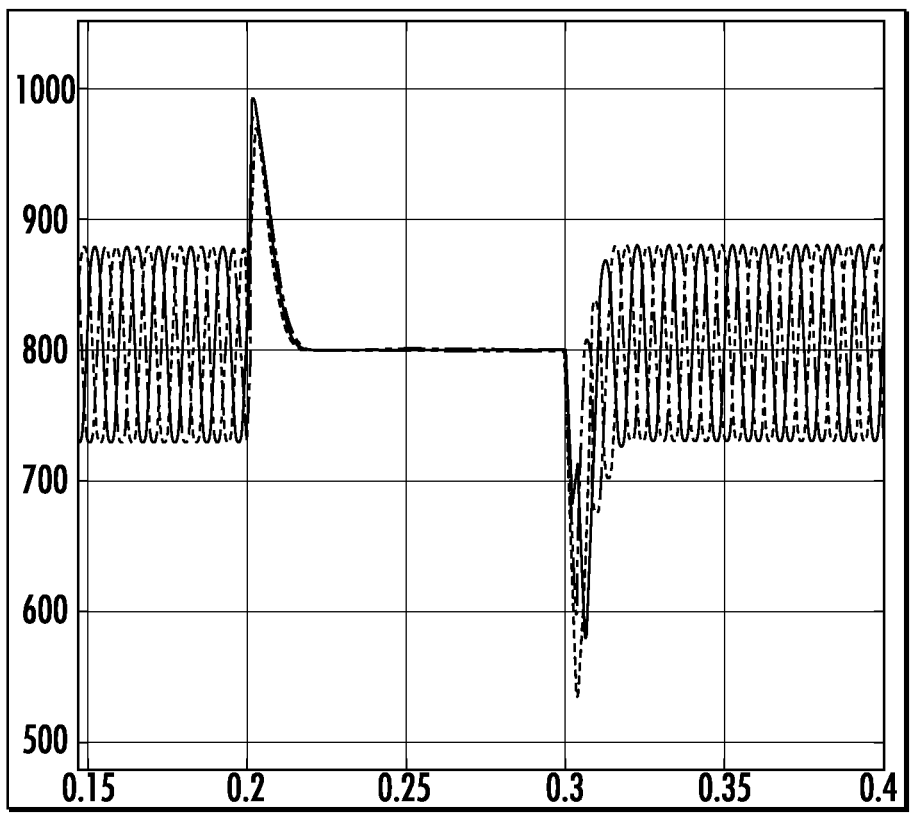
FIGS. 5a and 5b provide simulation calculations of voltage fluctuation waveforms (ripples) on the floating DC sides of the cascaded power conversion device including two power modules per phase as shown in FIGS. 2a to 2c according to Equation 5.
Figure 5B:
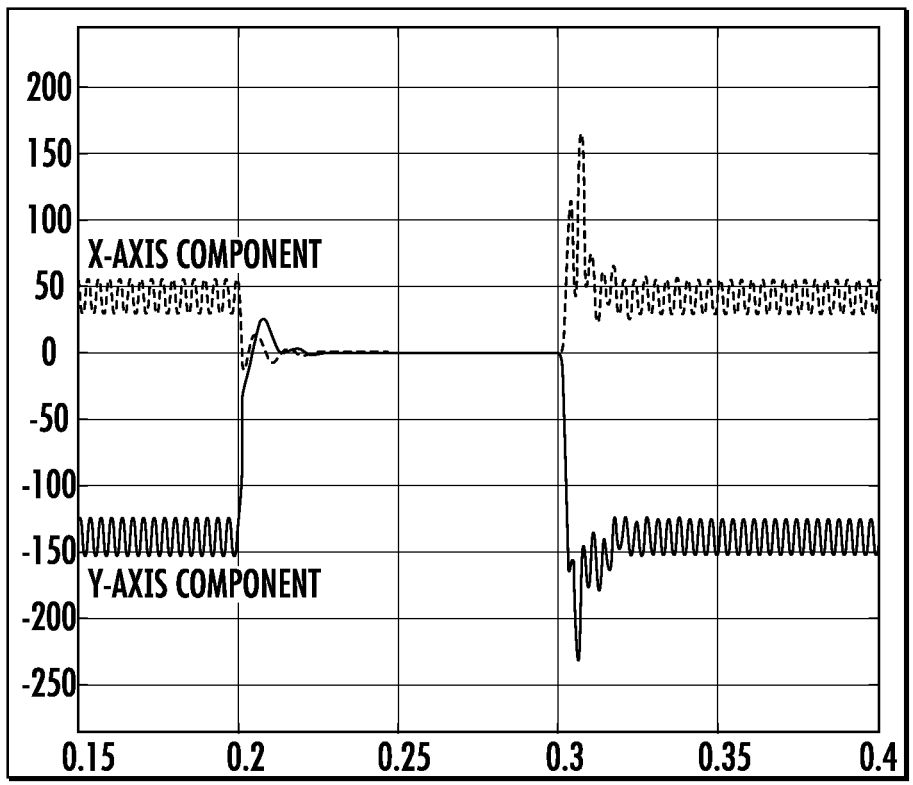

FIGS. 5a and 5b provide simulation calculations of voltage fluctuation waveforms (ripples) on the floating DC sides of the cascaded power conversion device including two power modules per phase as shown in FIGS. 2a to 2c according to Equation 5.

FIG. 5a simulates the voltage fluctuation waveforms on the floating DC sides of the respective second power modules of the three phases (the voltage fluctuation waveforms on the first and second power modules are consistent). A period of simulated voltage transient changes is added between about 0.2 milliseconds to 0.3 milliseconds. FIG. 5b shows waveform diagrams of X and Y-axis components of the second-order fluctuating voltage superposition vector Vdc_2nd in the X-Y orthogonal coordinate system obtained by performing a calculation according to Equation 5 for the cascaded power conversion device with two power modules per phase, wherein the X and Y-axis components each converge around a constant value, and the higher frequency fluctuations near this constant value are caused by higher frequency fluctuation components, but they do not affect the conclusion that the second-order fluctuating voltage superposition vector Vdc_2nd is represented as a constant value on each of the X and Y axes. In addition, it can be seen by comparing FIGS. 5a and 5b that when the transient state simulated in FIG. 5a occurs, the components of the calculated second-order fluctuating voltage superposition vector Vdc_2nd on the X and Y axes are calculated at the same time to obtain a corresponding transient second-order fluctuating voltage real-time value with a response time delay of zero.

According to the above analysis, the expression of the second-order fluctuating voltage superposition vector in the three-phase AC coordinate system has been obtained in Equation 2, that is, a real-time second-order fluctuation (ripple) superposition total amount in each phase has been obtained. If the power transferred by respective power modules of the single-phase power conversion module of this phase is pre-estimated or configured to be uniform, then the real-time second-order fluctuation (ripple) superposition total amount in each phase is evenly distributed to each power module, so that a control signal for the isolated DC-DC converter in the power module can be calculated according to the distribution value, so as to control the isolated DC-DC converter to transfer, to the low-voltage DC side, a pre-estimated second-order fluctuating voltage on the floating DC side connected thereto. However, in practical applications, the real-time second-order fluctuation (ripple) superposition total amount in each phase is not necessarily evenly distributed to the n power modules, and there may be an imbalance in the power transferred by different power modules from the mains grid to the low-voltage DC side. To this end, according to the transfer power ratio of each power module in the same phase, the power ratio corresponding to the second-order fluctuating voltage to be transferred from the floating DC side is distributed to the low-voltage DC side.

Figure 6:
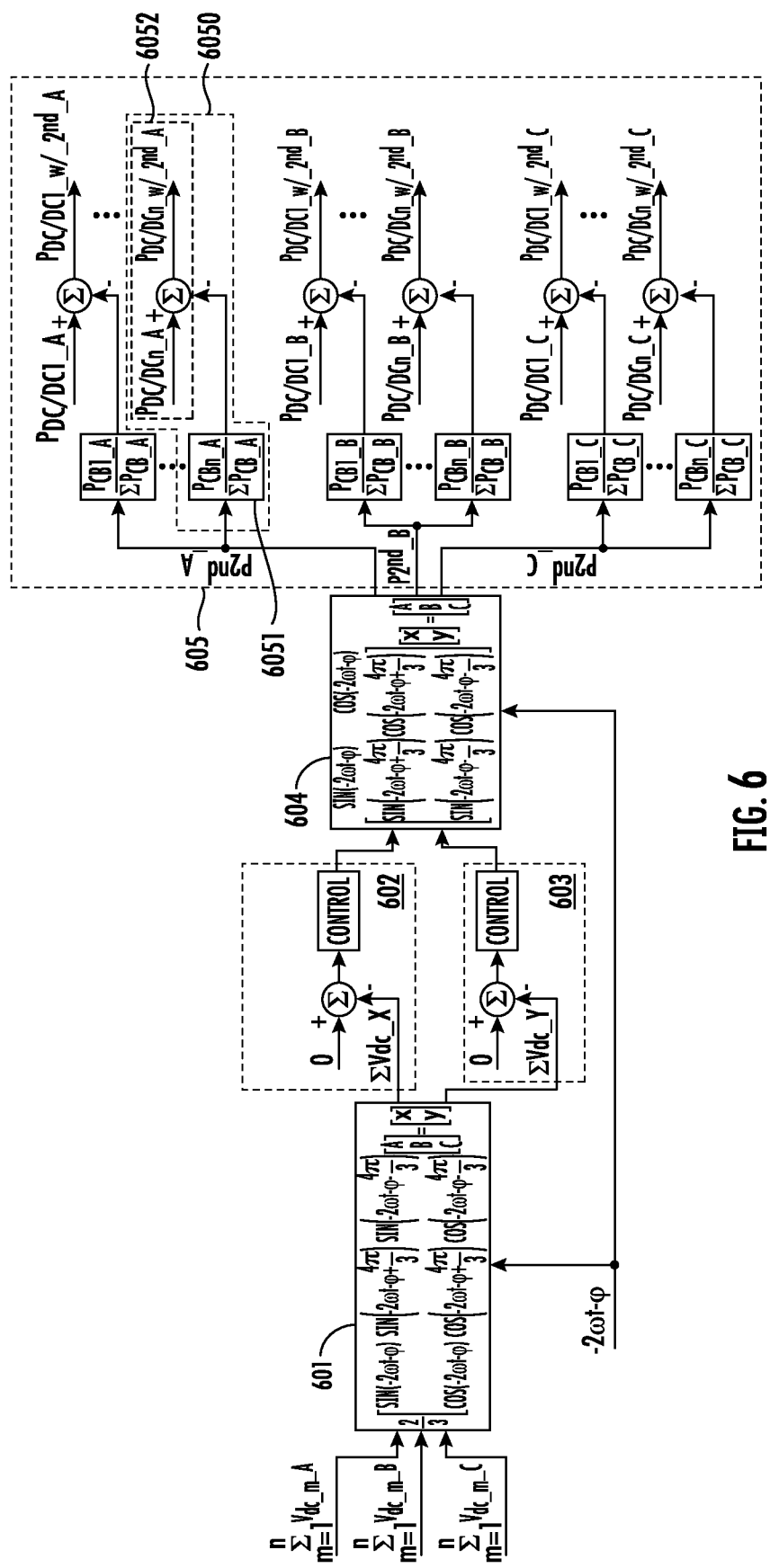
FIG. 6 shows a schematic flowchart in which intermediate-stage ripples are transferred according to the transfer power ratios of respective power modules according to an embodiment of the present inventive concept.

FIG. 6 shows a schematic flowchart in which intermediate-stage ripples are transferred according to the transfer power ratios of respective power modules according to an embodiment of the present inventive concept.

As shown in the positive sequence of the flow from left to right in FIG. 6, n power module superposition quantity vectors $$\sum_{m=1}^{n} V_{dc\_m\_A}$$

$$\sum_{m=1}^{n} V_{dc\_m\_B}$$

$$\sum_{m=1}^{n} V_{dc\_m\_C}$$

representing DC voltage quantities of respective floating DC sides of phases A, B and C are input into a module 601. In the module 601, the vector is converted to an X-Y rotating orthogonal coordinate system according to the coordinate transformation form shown in Equation 4, so that the module 601 outputs two DC components $\Sigma V_{dc\_x}$ and $\Sigma V_{dc\_y}$ of the second-order fluctuating voltage superposition vector Vdc_2nd on the X and Y axes. It should be noted that, in addition to directly inputting, into the module 601, the expression $$\sum_{m=1}^{n} V_{dc\_m\_A}$$

$$\sum_{m=1}^{n} V_{dc\_m\_B}$$

$$\sum_{m=1}^{n} V_{dc\_m\_C}$$

for the second-order fluctuating voltage superposition vector Vdc_2nd obtained according to Equation 2 in the three-phase coordinate system, as a variant, it is also possible to input, into the module 601, vectors $$\sum_{m=1}^{n} V_{dc\_2nd\_m\_A}$$

$$\sum_{m=1}^{n} V_{dc\_2nd\_m\_B}$$

$$\sum_{m=1}^{n} V_{dc\_2nd\_m\_C}$$

composed of n power module superposition quantities of the DC voltage quantities on the respective floating DC sides of the phases A, B, and C. This is because the respective DC quantities on the floating DC sides of the three phases after rectification are the same, but the same DC quantity in the three phases is not expressed in the d-q orthogonal rotating coordinate system or X-Y orthogonal rotating coordinate system.

The DC components $\Sigma V_{dc\_x}$ and $\Sigma V_{dc\_y}$ are output to inverting input ends of closed-loop controllers 602 and 603, respectively. Non-inverting input ends of the closed-loop controllers 602 and 603 each accept a signal of 0 as a reference. The closed-loop controllers 602 and 603 calculate and output control amount signals according to the ratios of the reference signal of 0 to the corresponding DC components $\Sigma V_{dc\_x}$ and $\Sigma V_{dc\_y}$, so as to control the isolated DC-DC converter in the power module to perform pulse width modulation, thereby controlling the two DC components $\Sigma V_{dc\_x}$ and $\Sigma V_{dc\_y}$ of the second-order fluctuating voltage superposition vector Vdc_2nd on the X and Y axes to gradually approach 0. The control amount signals output by the controllers 602 and 603 are still representations in the X-Y rotating orthogonal coordinate system. Therefore, the control amount signals need to be input into a module 604 to carry out coordinate transformation from the X-Y rotating orthogonal coordinate system to the three-phase coordinate system, and corresponding power values of the control amount signals are calculated, thereby obtaining single-phase power control amounts P2nd_A, P2nd_B and P2nd_C for the respective second-order fluctuating voltages of the three phases A, B and C which need to be transferred from the floating DC sides to the low-voltage DC side, and outputting the same from the module 604. A module 605 accepts the single-phase power control amounts P2nd_A, P2nd_B and P2nd_C for respective second-order fluctuating voltages output by the module 604, and correspondingly distributes the power control amounts for the second-order fluctuating voltages to each power module of each single-phase power conversion module. Specifically, the module 605 includes 3n power calculation modules having the same structure, and each power calculation module includes a gain module and a closed-loop control module. Taking an nth power module of the phase-A power conversion module as an example, a power calculation module in the module 605 corresponding thereto is denoted as 6050. The power calculation module 6050 includes a gain module 6051 and a superposition control module 6052, wherein the gain module 6051 receives the single-phase power control amount P2nd_A for the second-order fluctuating voltage of phase A, and calculates the ratio $$\frac{P_{cbn\_A}}{\sum P_{cb\_A}}$$

of me average Power $P_{cbn\_A}$ of the nth power module transferred from the floating DC side to the low-voltage DC side to the total power $\Sigma P_{cb\_A}$ transferred by phase A. Moreover, it is assumed that the ratio of the second-order fluctuating voltage generated by the module on the floating DC side is the same as the above power ratio. Thus, the single-module power control amount corresponding to the second-order fluctuating voltage of the nth power module which needs to be transferred from the floating DC side to the low-voltage DC side is obtained. Finally, the single-module power control amount is input into the superposition control module 6052 and is superimposed with a control signal $P_{DC/DCn\_A}$ for normally controlling the isolated DC-DC converter in the power module to perform DC-DC conversion, so as to form a final single-module control signal $P_{DC/DCn\_w/2^{nd}\_A}$. The single-module control signal $P_{DC/DCn\_w/2^{nd}\_A}$ is used to control the isolated DC-DC converter of the power module.

In order to test the ripple control process shown in FIG. 6, the ripple control process may be applied to the simulation calculations of the voltage fluctuation waveforms (ripples) on the floating DC sides shown in FIGS. 5a and 5b.

Figure 7A:
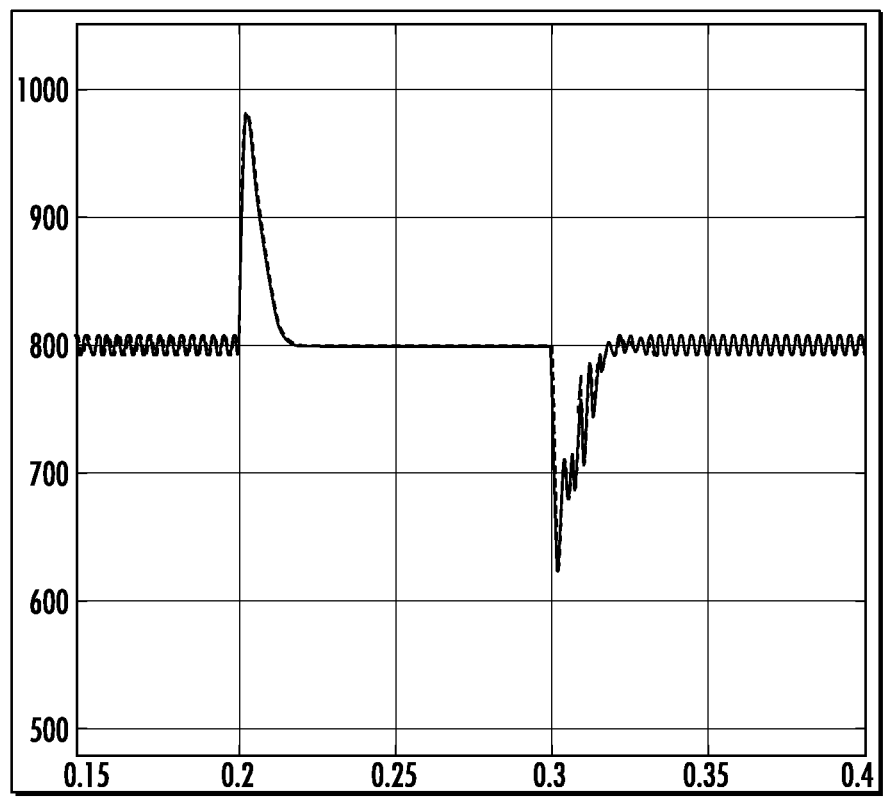
FIGS. 7a and 7b schematically show the effect of reducing the voltage fluctuation waveforms (ripples) on the floating DC sides in the simulation calculations shown in FIGS. 5a and 5b after the ripple control process shown in FIG. 6 has been applied.
Figure 7B:
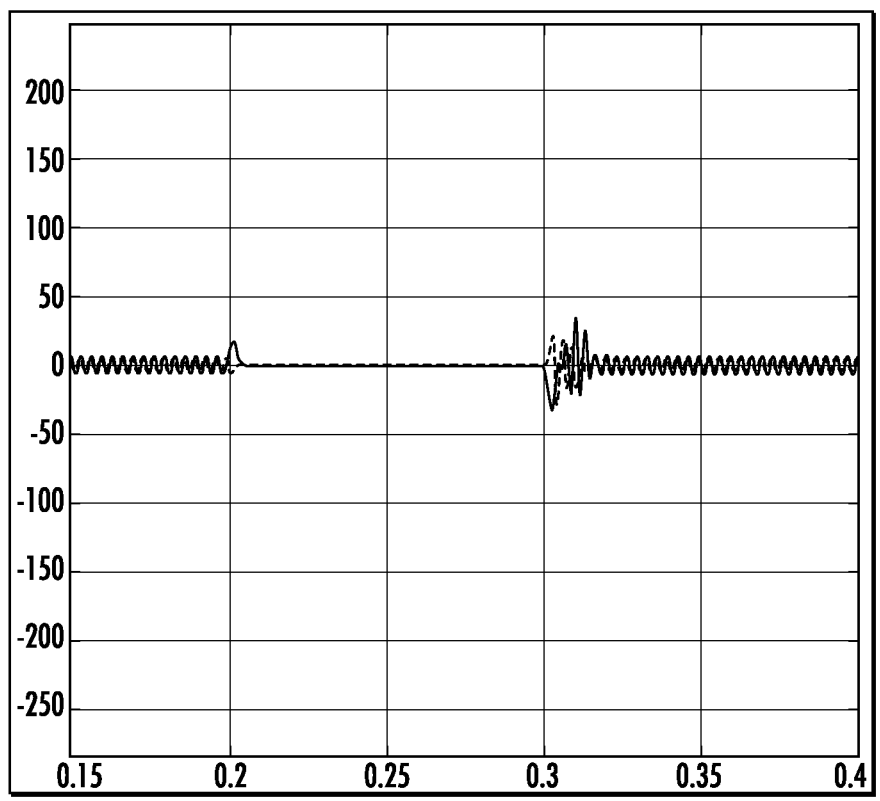

FIGS. 7a and 7b schematically show the effect of reducing the voltage fluctuation waveforms (ripples) on the floating DC sides in the simulation calculations shown in FIGS. 5a and 5b after the ripple control process shown in FIG. 6 has been applied.

FIG. 7a represents a ripple waveform after the second-order fluctuating voltage in the three-phase coordinate system shown in FIG. 5a has been reduced. In the steady-state simulation before 0.2 milliseconds and after 0.35 milliseconds, the second-order fluctuating voltage has been compressed to a value near zero. FIG. 7b shows that in the X-Y orthogonal rotating coordinate system shown in FIG. 5b, the X component and the Y component of the second-order fluctuating voltage are each reduced to be substantially zero in a steady state. Secondly, in light of the voltage transient changes around 0.2 milliseconds and 0.35 milliseconds, and in comparison with the waveform diagrams of FIGS. 5a and 5b that do not apply the ripple control process, it can be seen that the ripple reduction method of the present inventive concept has a very fast response speed, and the response is synchronous with real-time voltage transient changes without any time delay. The ripple control method of the present inventive concept has little to no time delay, greatly reduces the capacitance stress on the intermediate stage, and facilitates the miniaturization of the power conversion device.

Although the present inventive concept has been described through preferred embodiments, the present inventive concept is not limited to the embodiments described herein, but includes various changes and variations made without departing from the scope of the present inventive concept.

What is claimed is:

1. A ripple control method for a modular cascaded power conversion device, the modular cascaded power conversion device receiving three-phase AC power and outputting DC power to a low-voltage DC side, the modular cascaded power conversion device of each phase comprising an inductor and a plurality of power modules, and each power module comprising an AC-DC converter, a floating DC side, and an isolated DC-DC converter, wherein the AC-DC converters of the plurality of power modules are cascaded in sequence, and each AC-DC converter provides an output to a corresponding floating DC side; and an input end of the isolated DC-DC converter is connected to the floating DC side of the power module, and an output end of the isolated DC-DC converter is connected to the low-voltage DC side;

the ripple control method comprising:
obtaining, according to a grid voltage vector of the three-phase AC power, a second-order fluctuating voltage superposition vector representing a total amount of second-order fluctuating voltages on respective floating DC sides of the three phases;
determining, according to the second-order fluctuating voltage superposition vector, a single-phase power control amount of each phase to be transferred from the respective floating DC sides of the three phases to the low-voltage DC side;
determining, according to the single-phase power control amount of each phase, a single-module power control amount of each power module to be transferred to a low-voltage DC side thereof; and
for each power module, generating a single-module control signal for the corresponding power module according to the single-module power control amount, so as to transfer a second-order fluctuating voltage on the floating DC side of the power module to the low-voltage DC side thereof.

2. The ripple control method according to claim 1, wherein a cascaded bridge voltage and an AC current in a cascaded AC-DC converter in each phase are obtained by calculating a grid voltage of the modular cascaded power conversion device of the phase, thereby obtaining a three-phase cascaded bridge voltage vector and a three-phase AC current vector; and the second-order fluctuating voltage superposition vector is obtained by performing a calculation including the three-phase cascaded bridge voltage vector and the three-phase AC current vector.

3. The ripple control method according to claim 2, wherein the isolated DC-DC converter is controlled by using a closed-loop control method and by using the second-order fluctuating voltage superposition vector as a deviation amount, so as to determine the single-phase power control amount required to control a magnitude of the second-order fluctuating voltage superposition vector to zero.

4. The ripple control method according to claim 3, wherein in the modular cascaded power conversion device of each phase, a power distribution ratio of each power module relative to a total power of all power modules of the phase in a power transfer process is determined, and the single-module power control amount of the power module to be transferred from the floating DC side thereof to the low-voltage DC side thereof is obtained according to a product of the power distribution ratio of the power module and the single-phase power control amount of the phase.

5. The ripple control method according to claim 4, wherein the single-module control signal is formed by superimposing the single-module power control amount and a control amount for controlling the isolated DC-DC converter in the power module to perform DC-DC conversion.

6. The ripple control method according to claim 3, wherein a three-phase cascaded voltage vector is determined in a three-phase coordinate system as:

$$\begin{bmatrix} V_{CB_A} \\ V_{CB_B} \\ V_{CB_C} \end{bmatrix},$$

and is converted to a d-q rotating coordinate system to be expressed as:

$$\begin{bmatrix} V_{CB_d} \\ V_{CB_q} \end{bmatrix};$$

the three-phase AC current vector is determined in the three-phase coordinate system as:

$$\begin{bmatrix} I_A \\ I_B \\ I_C \end{bmatrix},$$

and is converted to the d-q rotating coordinate system to be expressed as:

$$\begin{bmatrix} I_d \\ I_q \end{bmatrix};$$

and
the second-order fluctuating voltage superposition vector is determined in the three-phase coordinate system as:

$$\begin{bmatrix} \sum_{m=1}^{n} V_{dc_{2n_{m_A}}} \\ \sum_{m=1}^{n} V_{dc_{2n_{m_B}}} \\ \sum_{m=1}^{n} V_{dc_{2n_{m_C}}} \end{bmatrix} = \frac{1}{2\omega C_{dc} V_{dc}}$$

$$\begin{bmatrix} [V_{CB_d} \ V_{CB_q}] \begin{bmatrix} -\cos(2\omega t + 2\theta) & \sin(2\omega t + 2\theta) \\ \sin(2\omega t + 2\theta) & \cos(2\omega t + 2\theta) \end{bmatrix} \\ [V_{CB_d} \ V_{CB_q}] \begin{bmatrix} -\cos\left(2\omega t + 2\theta - \frac{4\pi}{3}\right) & \sin\left(2\omega t + 2\theta - \frac{4\pi}{3}\right) \\ \sin\left(2\omega t + 2\theta - \frac{4\pi}{3}\right) & \cos\left(2\omega t + 2\theta - \frac{4\pi}{3}\right) \end{bmatrix} \\ [V_{CB_d} \ V_{CB_q}] \begin{bmatrix} -\cos\left(2\omega t + 2\theta + \frac{4\pi}{3}\right) & \sin\left(2\omega t + 2\theta + \frac{4\pi}{3}\right) \\ \sin\left(2\omega t + 2\theta + \frac{4\pi}{3}\right) & \cos\left(2\omega t + 2\theta + \frac{4\pi}{3}\right) \end{bmatrix} \end{bmatrix} \begin{bmatrix} I_d \\ I_q \end{bmatrix},$$

where $\omega$ is an AC frequency, $C_{dc}$ is connection capacitance of the floating DC side, $V_{dc}$ is an average voltage value of the floating DC side, $\theta$ is an initial phase angle, and t is time.

7. The ripple control method according to claim 6, wherein a relationship between the grid voltage and the three-phase cascaded voltage vector and three-phase AC current vector in the three-phase coordinate system is expressed as:

$$\begin{bmatrix} V_{grid_A} \\ V_{grid_B} \\ V_{grid_C} \end{bmatrix} = \omega L_{ac} \begin{bmatrix} I_A \\ I_B \\ I_C \end{bmatrix} + \begin{bmatrix} V_{CB_A} \\ V_{CB_B} \\ V_{CB_C} \end{bmatrix}$$

where $L_{ac}$ is an inductance of the inductor.

8. The ripple control method according to claim 7, wherein an X-Y rotating coordinate system is configured according to a rotational angular velocity of the second-order fluctuating voltage superposition vector in the three-phase coordinate system, so that the second-order fluctuating voltage superposition vector is expressed in the X-Y rotating coordinate system as constant quantities on X and Y axes; and
the closed-loop control method is performed according to a constant quantity expression for the second-order fluctuating voltage superposition vector in the X-Y rotating coordinate system.

9. The ripple control method according to claim 8, wherein the constant quantity expression for the second-order fluctuating voltage superposition vector in the X-Y rotating coordinate system is:

$$\begin{bmatrix} \sum V_{dc_{2nd_X}} \\ \sum V_{dc_{2nd_Y}} \end{bmatrix} =$$

$$\frac{2}{3} \begin{bmatrix} \sin(-2\omega t - \varphi) & \sin\left(-2\omega t - \varphi + \frac{4\pi}{3}\right) & \sin\left(-2\omega t - \varphi - \frac{4\pi}{3}\right) \\ \cos(-2\omega t - \varphi) & \cos\left(-2\omega t - \varphi + \frac{4\pi}{3}\right) & \cos\left(-2\omega t - \varphi - \frac{4\pi}{3}\right) \end{bmatrix} \begin{bmatrix} \sum_{m=1}^{n} V_{dc_{2nd_{m_A}}} \\ \sum_{m=1}^{n} V_{dc_{2nd_{m_B}}} \\ \sum_{m=1}^{n} V_{dc_{2nd_{m_C}}} \end{bmatrix} =$$

-continued $$\frac{1}{2\omega C_{dc}V_{dc}}\begin{bmatrix} -V_{CB_d}\sin(2\theta-\varphi)-V_{CB_q}\cos(2\theta-\varphi) & -V_{CB_d}\cos(2\theta-\varphi)+V_{CB_q}\sin(2\theta-\varphi) \\ -V_{CB_d}\cos(2\theta-\varphi)+V_{CB_q}\sin(2\theta-\varphi) & V_{CB_d}\sin(2\theta-\varphi)+V_{CB_q}\cos(2\theta-\varphi) \end{bmatrix}\begin{bmatrix} I_d \\ I_q \end{bmatrix}.$$

10. A modular cascaded power conversion device that receives three-phase AC power and outputs DC power to a low-voltage DC side, comprises:
- for each phase, an inductor and a plurality of power modules, each power module including an AC-DC converter, a floating DC side, and an isolated DC-DC converter,
  - the AC-DC converters of the plurality of power modules being cascaded in sequence,
  - each AC-DC converter providing an output to a corresponding floating DC side,
  - each floating DC side having a first capacitor,
  - an input end of the isolated DC-DC converter being connected to the floating DC side of the power module, and
  - an output end of the isolated DC-DC converter being connected to the low-voltage DC side; and
- a control module configured to perform the ripple control method according to claim 1.

11. A modular cascaded power conversion device that receives three-phase AC power and outputs DC power to a low-voltage DC side, comprises:
- for each phase, an inductor and a plurality of power modules, each power module including an AC-DC converter, a floating DC side, and an isolated DC-DC converter,
  - the AC-DC converters of the plurality of power modules being cascaded in sequence,
  - each AC-DC converter providing an output to a corresponding floating DC side,
  - each floating DC side having a first capacitor,
  - an input end of the isolated DC-DC converter being connected to the floating DC side of the power module, and
  - an output end of the isolated DC-DC converter being connected to the low-voltage DC side; and
- a control module configured to:
  - obtain, according to a grid voltage vector of the three-phase AC power, a second-order fluctuating voltage superposition vector representing a total amount of second-order fluctuating voltages on respective floating DC sides of the three phases;
  - determine, according to the second-order fluctuating voltage superposition vector, a single-phase power control amount of each phase to be transferred from the respective floating DC sides of the three phases to the low-voltage DC side;
  - determine, according to the single-phase power control amount of each phase, a single-module power control amount of each power module to be transferred to a low-voltage DC side thereof; and
  - for each power module, generate a single-module control signal for the corresponding power module according to the single-module power control amount, so as to transfer a second-order fluctuating voltage on the floating DC side of the power module to the low-voltage DC side thereof.

* * * * *